I. W. PULLMAN.
MILK PAIL.
APPLICATION FILED DEC. 23, 1912.

1,103,431. Patented July 14, 1914.

WITNESSES:
Marie Meyer

INVENTOR.
Irving W. Pullman
BY
Arthur B. Jenkins
ATTORNEY.

UNITED STATES PATENT OFFICE.

IRVING W. PULLMAN, OF BRISTOL, VERMONT.

MILK-PAIL.

1,103,431.   Specification of Letters Patent.   Patented July 14, 1914.

Application filed December 23, 1912. Serial No. 738,121.

*To all whom it may concern:*

Be it known that I, IRVING W. PULLMAN, a citizen of the United States, and a resident of Bristol, in the county of Addison and State of Vermont, have invented a new and Improved Milk-Pail, of which the following is a specification.

My invention relates to the class of devices above named, and an object of my invention, among others, is to provide a milk pail that shall be extremely sanitary, in that dirt and all extraneous matter is prevented from entering the pail in the process of milking, or in emptying the milk from the pail.

One form of device embodying my invention, and in the construction and use of which the objects above set out, as well as others, may be attained is illustrated in the accompanying drawings, in which—

Figure 1:
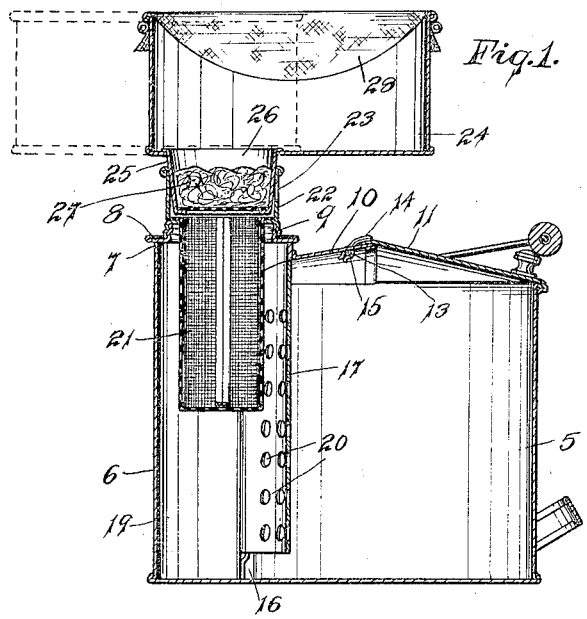
Figure 2:
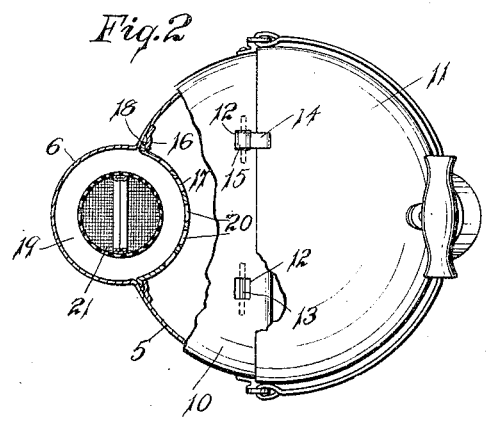
Figure 3:
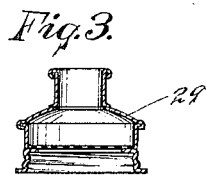

Figure 1 is a view in vertical section through my improved milking pail. Fig. 2 is a top view of the pail, with parts cut away to show construction. Fig. 3 is a detail view showing an attachable spout.

In the accompanying drawings, the numeral 5 denotes the pail, that may be of any desirable material, preferably round in cross section, and having at what will be termed the front a swell 6, of hemispherical form in cross section, constituting part of a straining chamber. The top 7 of this swelled portion, above the top of the pail, is round in cross section, and is partially closed by a cover 8 having a screw threaded neck 9 within which an opening to the pail is located. The pail about this swelled portion has a stationary top 10 secured in any desired manner, and a removable swinging lid 11 closes the remainder of the top of the pail.

In attaching the swinging lid, openings 12 are formed in the stationary top 10, and pintles 13 are secured to said top, extending across the openings. Spring clips 14 are secured to the lid 11, these clips having spring fingers 15 constructed to frictionally grasp the pintles that serve as a pivot for the lid, these fingers being so constructed that they will yield when proper force is applied and thus permit removal of the swinging lid. The clips are so formed that they completely close the openings 12 when the lid is down, as shown in Fig. 1 of the drawings.

A lip 16 projects from the inner surface of the pail at each edge of the swell 6, and a plate 17, having flanges 18 along each edge to removably engage beneath the lips 16 forms one wall of a straining chamber 19. This plate is composed of material having spring qualities so that it may be sprung into place, and it is also provided with perforations 20 through which the milk is strained, the lower end of the plate preferably terminating a short distance above the top of the milk. Other means for removably securing the plate in place may be employed, but that just described constitutes a satisfactory means for accomplishing the desired results. By thus constructing the straining chamber, located partially in a swell at the front of the pail and the balance of said chamber within the pail, bounded by the plate 17, an entrance of small area, as compared with that of the pail, is provided, which effectually retains the froth within the pail and permits the clear milk to be poured therefrom. This construction of the chamber, together with the removable plate, also provides a structure which enables the pail to be thoroughly and quickly cleaned.

A strainer tube 21, of perforated material, is removably secured to the top 7 of the swell 6, the bottom of the tube being preferably also of perforated material, and the top being screw threaded to fit the screw threaded neck 9. The top of the tube is extended to form a mouth piece 22 having vent openings 23 on one side to aid the flow of milk through the tube 21.

A receiver 24 is removably fitted to the mouth piece 22, this receiver being preferably round in cross section and having a projection 25 containing a filtering chamber 26 within which a suitable filtering material 27, as cotton, is placed. This projection is preferably tapered to a smaller dimension at the bottom to provide a space between it and the inner surface of the mouth piece 22 for the passage of air through the vent openings 23, the projection near the bottom of the receiver being of a size to snugly fit the mouth piece 22 to removably secure said receiver in place. The projection 25 is preferably located at one side of the center of the receiver so that the latter may be located in different positions with respect to the pail, as illustrated in dotted lines in Fig. 1 of the drawings.

A strainer cloth 28 may be removably secured across the opening into the receiver to prevent the milk entering the receiver with force, and the filtering chamber, especially in connection with the other parts, effectually prevents the entrance of any extraneous matter within the pail, either in the process of milking, or in emptying the milk from the pail, and the construction of the receiver so that it may be located in different positions, enables one to locate himself in different positions with respect to the animal being milked. A removable spout 29 having a reduced outlet is provided for the purpose of pouring the milk into receptacles having small mouths.

I have illustrated and described herein a construction that very satisfactorily accomplishes the desired results, but this may be changed to a greater or lesser extent, without departing from the spirit or intent of the invention, which is therefore not confined to a structure made in exact accordance with that herein shown.

I claim:

1. A milk pail having a swell reduced in size as compared with the body of the pail and of semi-circular form extending lengthwise along the front thereof, and a wall of semicircular form extending across the mouth of said swell, forming therewith a straining chamber, said straining chamber having an opening through the top of the pail.

2. A milk pail including a top having an opening therethrough, and a receiver having a projection extending downwardly from the bottom and eccentrically located thereon, said projection containing a chamber opening upwardly into the receiver.

3. A milk pail having a swell at its front portion, a strainer plate extending across said swelled part within the pail, forming a straining chamber that has a round opening through the top of the pail, and a receiver having a projection eccentrically located thereon and removably fitting said opening, said projection forming a filtering chamber.

4. A milk pail including a top having an opening therein, a mouth piece having a strainer tube projecting through said opening, and a receiver having a projection fitting said mouth piece.

5. A milk pail including a top having an opening therein, a mouth piece having a strainer tube projecting through said opening, said mouth piece having vent openings therein, and a receiver having a projection fitting said mouth piece.

6. A milk pail having a swell at its front portion reduced in size as compared with the body of the pail and of semi-circular form and extending lengthwise along the front of the pail, a wall of semi-circular form extending across the mouth of the swell forming a straining chamber having an opening through the top of the pail, a mouth piece having a strainer tube within said straining chamber and concentrically arranged therein, and a receiver having a projection extending into said mouth piece.

IRVING W. PULLMAN.

Witnesses:
WILLIAM W. WILSON,
RALPH A. PURINTON.

Copies of this patent may be obtained for five cents each, by addressing the "Commissioner of Patents, Washington, D. C."